United States Patent [19]
Shaw

[11] 3,744,474
[45] July 10, 1973

[54] STEAM COOKING APPARATUS AND METHOD

[75] Inventor: Harold N. Shaw, Harwich, Mass.

[73] Assignee: Beatrice Foods Co., Chicago, Ill.

[22] Filed: Mar. 1, 1971

[21] Appl. No.: 122,587

[52] U.S. Cl. .................................. 126/20, 99/330
[51] Int. Cl. ............................................. A21b 1/08
[58] Field of Search ................... 126/20, 369, 374, 126/377; 99/234 A, 330

[56] References Cited
UNITED STATES PATENTS
2,034,473 3/1936 Kitamura ........................ 126/20 X
1,383,110 6/1921 Hadaway, Jr. ..................... 126/20

*Primary Examiner*—Edward G. Favors
*Attorney*—Roberts, Cushman & Grover

[57] ABSTRACT

A steam cooker of the type used principally to quickly cook quantities of fresh or frozen foods, characterized by rapid attainment of cooking conditions and economical and safe use of steam. A chamber, into which the food is introduced for cooking, has an inlet passage for connection to a source of steam and a free-venting outlet passage through which displaced air and condensate are drained. Disposed in the outlet passage are temperature-sensing means which detect full displacement of air from the chamber by a rise of temperature to near that of the steam, e.g., 200°–212°F. When this condition has been attained the flow of steam from the steam source is terminated in response to the temperature-sensing means through the action of flow controlling means of a type appropriate to the particular steam source used. This temperature-sensing means may then connect heating means provided to superheat the steam in the chamber and when the outlet passage cools, the temperature-sensing means turns off the heating means and reconnects the steam. One steam flow controlling means is a solenoid-operated valve closing the inlet passage; another is a control which reduces heat to a steam boiler and another is a control which reduces the water supply to a flask steam generator.

9 Claims, 5 Drawing Figures

3,744,474
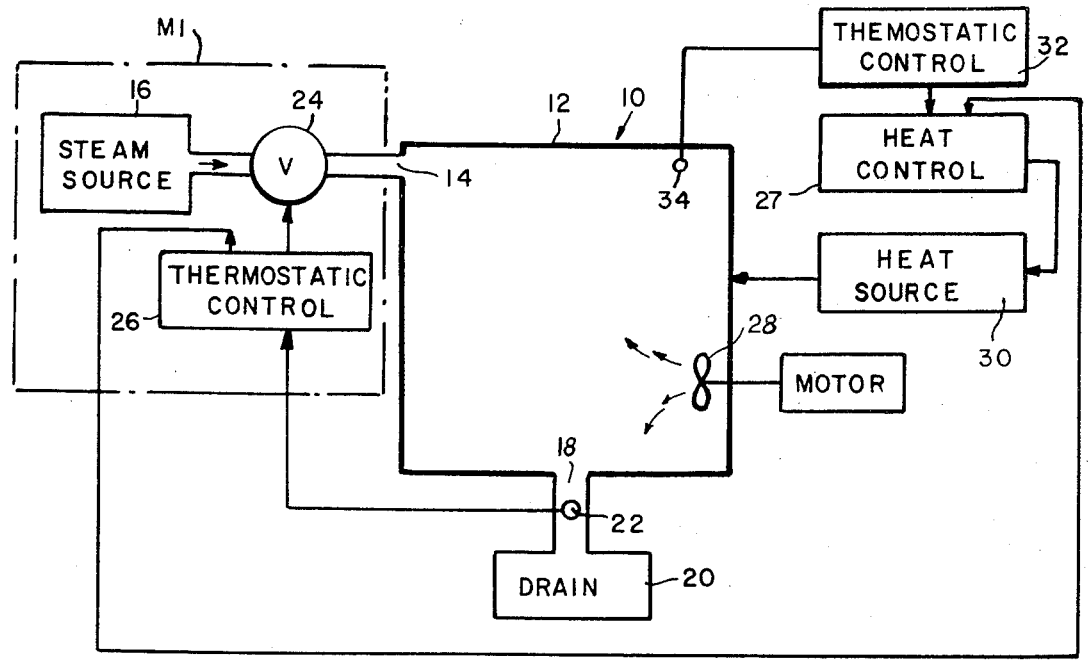
FIG.1
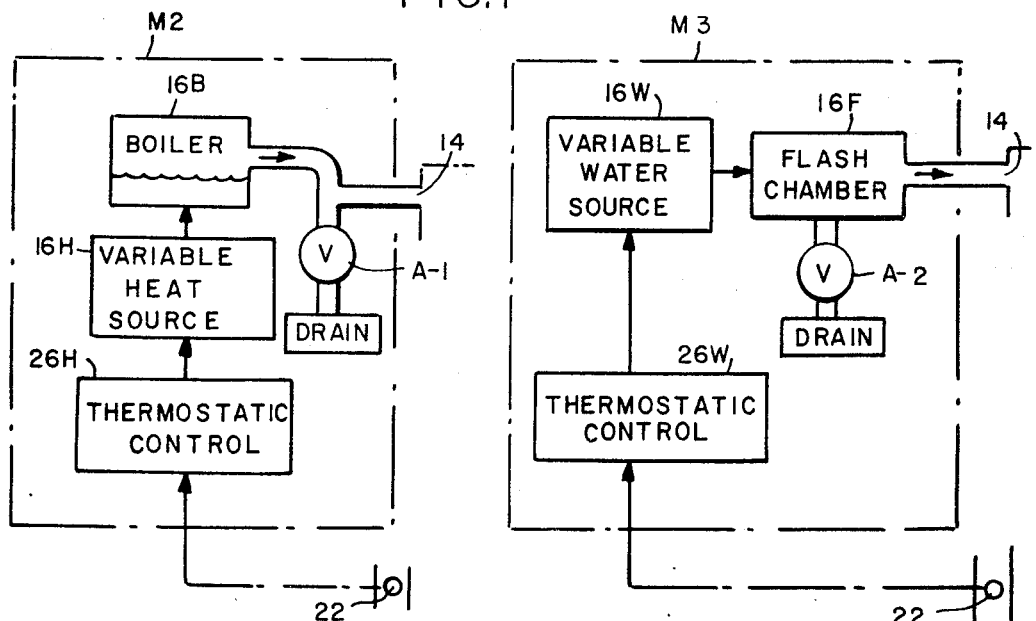
FIG.2
FIG.3
INVENTOR
HAROLD N. SHAW
BY Roberts, Cushman & Grover
ATT'YS

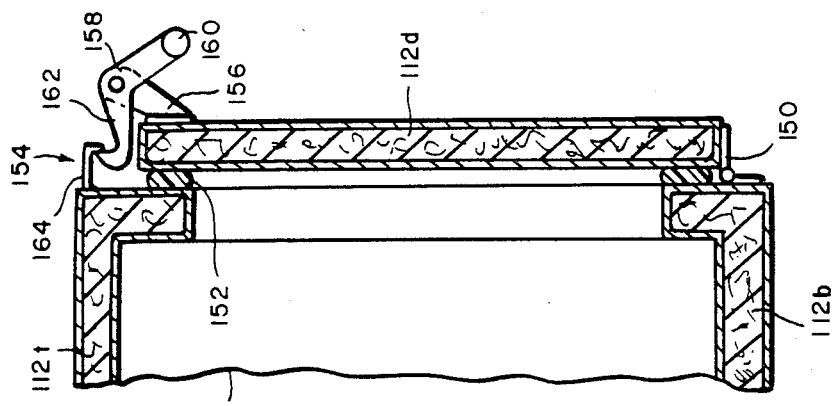
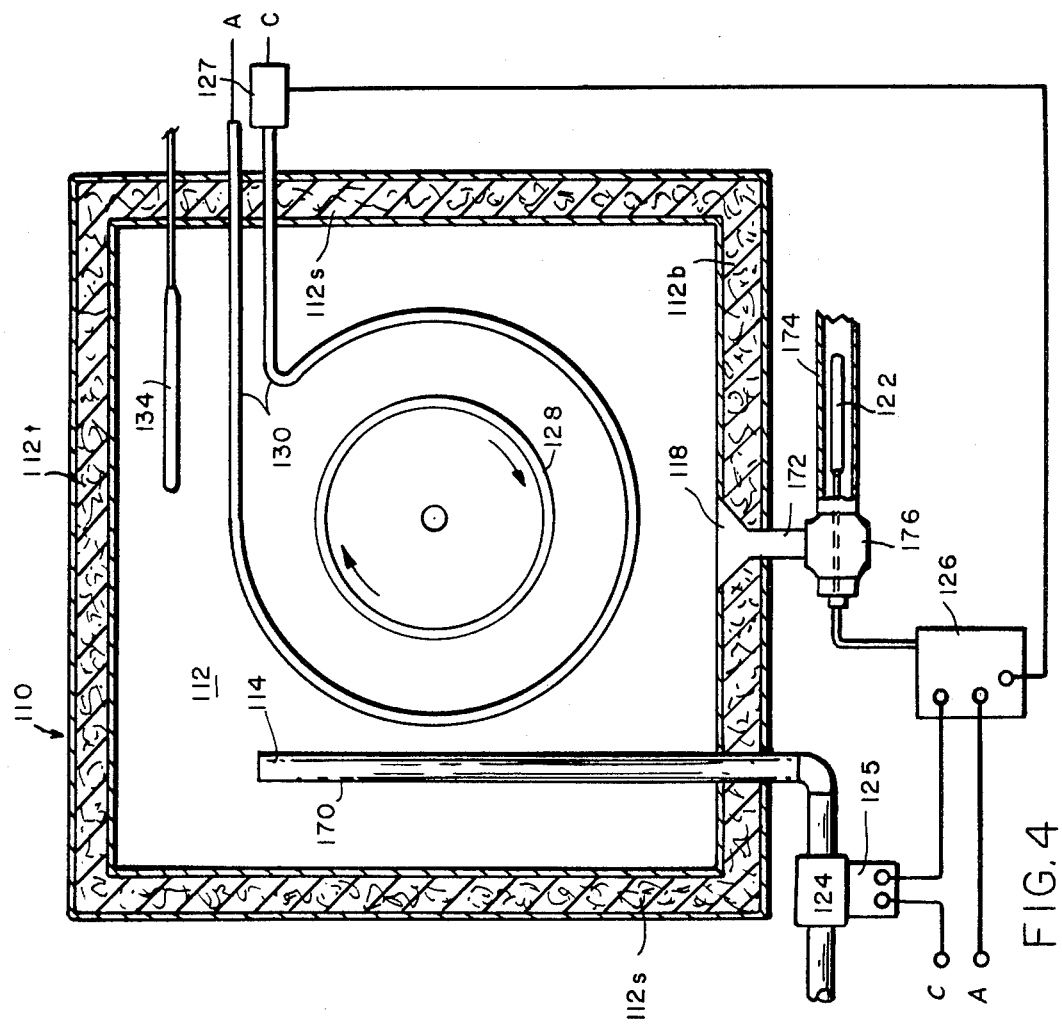

STEAM COOKING APPARATUS AND METHOD

BACKGROUND OF THE INVENTION

The field of the present invention relates to cooking devices, and more particularly to steam cooking devices employing an external source of steam and used primarily to cook fresh and frozen foods.

The processing of frozen foods, particularly in large quantities as in schools, hospitals, and other institutions, involves a large component of time in waiting for frozen foods to defrost and to cook. Time and labor can be minimized if the frozen food can go directly from the freezer to the cooker without an intermediate defrosting step, and if the cooker can rapidly ready the food for serving. Such direct frozen food reconstituting eliminates not only the need for the intermediate defrosting refrigerator, but also the need for guessing hours in advance on the amount to be defrosted and served.

Several possibilities for direct reconstituting are available, but conventional ovens have a low rate of heat transfer and thus are too slow, while microwave ovens have limited capacity. Cooking food in a steam atmosphere is relatively inexpensive and provides a high rate of heat transfer due to the high latent heat of condensation delivered by the condensing steam, and thus steam offers the best prospect for direct defrosting and rapid cooking of frozen foods. Steam cooking devices actually developed, however, are not without problems. For example, pressurized steam cookers, or "pressure cookers", have two drawbacks. First, because they generate substantial pressures, strong structures and safety valves are required for safety, and pressure build-up and let-down times are needed. Second, because the pressure cooker is sealed, a long time is required before the steam temperature is reached as initially formed steam condenses, is retained, and the condensate must be reheated before cooking temperatures are reached. Other steam cookers devised to meet these problems have met comparable problems. A cooker could have an outlet to drain condensate formed by incoming steam and have a steam trap in the outlet which closes thermostatically when a steam atmosphere is obtained. However, grease and food particles inevitably present in the cooker collect on the valve seat of the trap and hold it open. If the trap is eliminated and a completely free-venting system is used, then steam consumption is excessive and some means must be provided to make harmless the discharge of live steam.

SUMMARY

Objects of the present invention are to provide a steam cooker which rapidly attains cooking conditions, which quickly defrosts and cooks food therein, which economically and safely uses steam, and which is simple and inexpensive to build and reliable and versatile in use.

According to the invention, the steam cooking device comprises a chamber into which food is introduced for cooking, an inlet passage connecting a source of steam to said chamber, a free-venting outlet passage from said chamber through which air and condensed steam drain, temperature-sensing means in the outlet passage, and means responsive to the temperature sensitive means for controlling the flow of steam through the inlet passage into the chamber. Preferably the flow controlling means stops the inflow of steam when the temperature in the outlet passage is close to the temperature of the steam, which signifies that substantially all air in the chamber has been replaced by steam. The cooking chamber may also be provided with heating means of the conventional type used in gas or electric ovens, and the temperature-sensing device may be of the double-throw type to connect the heat source when the steam source is disconnected. In various practical embodiments the steam flow controlling means takes the form of a solenoid-controlled valve situated to close the inlet passage; a heat control to limit the production of steam in a free-venting direct connected boiler-type steam generator; or a water control to limit the production of the steam in a flash-type steam generator. Preferably the steam cooking device is provided with an internal circulation means, such as a fan or blower, to promote even heating by steam. This device can be used as an oven, a steam cooker, or as a cooker to defrost in steam and continue heating in superheated steam.

These and other objects and novel aspects of the invention will be apparent from the following description of preferred embodiments.

DESCRIPTION OF THE DRAWING

Fig. 1 is an essentially schematic elevation of a steam cooking device according to the invention;

FIG. 2 is a partial elevation similar to FIG. 1, showing a first modification of the invention;

FIG. 3 is a partial elevation similar to FIG. 1, showing a second modification of the invention;

FIG. 4 is a sectional elevation of a practical embodiment corresponding to FIG. 1; and FIG. 5 is a partial section on line 5—5 of FIG. 4.

DESCRIPTION OF THE PREFERRED EMBODIMENTS

Referring to the drawing, FIG. 1 illustrates schematically a steam cooking device 10 according to the invention. The cooking device 10 comprises a thermally insulated chamber 12 into which food and steam are introduced for cooking. The food enters chamber 12 by means of a gasketed door (not shown) which provides a low pressure seal. An inlet passage 14 connects chamber 12 to a source 16 of steam provided, for example, by a boiler. The steam pressure in the chamber is sufficient only to force air from chamber 12 at a reasonable rate, and a pressure of a few inches of water is usually sufficient. Steam entering chamber 12 through inlet passage 14 not only displaces air from the chamber but also changes phase by condensing to liquid as it liberates heat to the food. The displaced air and condensate leave chamber 12 through an outlet passage 18 which leads to a suitable drain 20. Neither outlet passage 18 nor drain 20 restricts free flow, and thus chamber 12 is of the free-venting type without need to withstand high pressures, to provide safety valves, or to comply with boiler codes.

Optimal steam control in chamber 12 allows steam to flow continuously to rapidly displace air and attain cooking conditions, and then only as needed to maintain the steam atmosphere and a high cooking rate. The steam cooker 10 illustrated in FIG. 1 supplies this control both accurately and reliably by situating a temperature sensor 22 in the outlet passage 18 to detect the temperature of the material leaving the chamber 12. When the cooker 10 is first turned on the efflux from chamber 12 will be displaced air and condensate at low temperature; as steam flows and the temperature rises and substantially all air has been displaced, the efflux temperature will be substantially that of the steam. Steam at sea level atmospheric pressure has a temperature of 212°F., and temperatures of this magnitude, for example in the range 200°–212°F., serves as a convenient indicator of substantially full displacement of air and attainment of a steam cooking atmosphere. Once this temperature has been reached, further steam flow through inlet passage 14 is stopped. When the outlet passage cools off and the temperature drops a prescribed amount, the sensor reconnects the steam supply until the passage reheats and this cycling continues with less and less steam flow as the food is heated.

As shown in FIG. 1 steam flow through inlet passage 14 is controlled by a valve 24 located between steam source 16 and chamber 12, and opened or closed by a thermostatic control means 26 responsive to temperature sensor 22. Suitable devices to serve as thermostatic control means 26 and temperature sensor 22 are well-known to the temperature control arts, an example being a solenoid-operated valve responsive to a thermostatic switch. As described below in connection with FIGS. 2 and 3, other means appropriate to particular steam sources are available to terminate steam flow through inlet passage 14 when a steam atmosphere is attained in chamber 12. These means eliminate the need for a valve in the steam line and allow use of free-venting steam source which do not come under any boiler code.

FIG. 1 also illustrates in schematic form two further elements of cooking device 10. A fan or blower 28 is provided to obtain circulation in chamber 12 so that convection heat transfer takes place. Cooker 10 is also provided with a heat source 30 governed by its own independent temperature sensor 34 and thermostatic control 32 which operates heat control 27. The heat source 30 can function alone, thus permitting chamber 12 to be used as an ordinary oven, and can also be used to superheat the steam atmosphere in chamber 12. The superheated steam is desirable in many instances not only to hasten cooking processes, but also to evaporate any condensate formed on the food in solid pans which otherwise might make it too moist. With heat as well as steam, a double-throw thermostate 26 is used to connect the heat control 27, when the steam is off, and disconnect the heat control when the steam source is connected. In some cases the thermostate 26 may be replaced by a double-throw timer which disconnects the steam and connects the heat source, to provide heating in saturated steam for a set time and then heating in superheated steam for the balance of the operation, with the steam source disconnected. In other cases a timer may be used in connection with the thermostat to turn on the heat source after the cooker has been operating with steam only, so as to provide two cooking periods, first on saturated steam and then on superheated steam.

FIGS. 2 and 3 illustrate modifications of the steam source and control portion of cooker 10 which is contained within the dashed line M1 of FIG. 1. The modifications illustrate different controls tailored to particular methods of steam generation. Modified portion M2 shown in FIG. 2 employs a steam source comprising a free-venting boiler 16B receiving heat from a variable heat source 16H. A thermostatic control 26H, responsive to sensor 22, controls the application of heat from source 16H to boiler 16B and thus controls the production of steam flowing through inlet passage 14. When sensor 22 indicates that chamber 12 is fully occupied by steam, the thermostatic control 26H stops heat transmission from source 16H so that boiler 16B produces no more steam. Conversely, when sensor 22 indicates too little steam to be in chamber 12, more steam is produced. To insure rapid response the boiler water is steadily heated to about 200°F.

The steam source employed by modified portions M3 of FIG. 3 is of the flash-generator type and comprises a steadily heated flash chamber 16F which receives water to be converted into steam from a variable water source 16W. A thermostatic control 26W, responsive to senor 22, controls the supply of water from source 16W to flash chamber 16F and thus controls the production of steam flowing through inlet passage 14. When sensor 22 indicates that chamber 12 is occupied by steam, the thermostatic control 26W stops the water supply and no more steam is produced; when sensor 22 indicates too little steam to be in chamber 12, water is supplied and more steam is produced. In FIG. 2 a drain valve A-1 is shown between 16B and 14 and in FIG. 3 a similar valve A-2 is shown below 16F.

FIGS. 4 and 5 illustrate a practical embodiment 110 of the steam cooker 10 illustrated schematically in FIG. 1. As shown in FIGS. 4 and 5, the cooking chamber 112 of cooker 110 is formed with top wall 112$t$, bottom wall 112$b$, three side walls 112$s$ and a front door 112$d$. The front door 112$d$ has a bottom hinge 150, a gasket 152 to prevent low pressure steam from leaking through the door opening and an upper catch 154. The catch 154 comprises a bracket 156 mounted on the door, and a handle 158 pivotally mounted to bracket 156 between a hand grip portion 160 and a hook portion 162. A latch bar 164 secured to top wall 112$t$ interengages with hook portion 162 to hold door 112$d$ shut, the hook being disengaged therefrom to open the door. It should be noted that door 112$d$ can be opened safely during the cooking process, as the low steam pressure in chamber 112 will not propel steam outward to any large extent when the door is opened.

In cooking device 110 the steam inlet passage 114 is provided by a tube 170 extending through bottom wall 112$b$ to the upper portion of chamber 112. The tube 170 is connected to a steam source (not shown) through a valve 124 operated by a solenoid 125. The outlet passage 118 from chamber 112 is provided by a bell-mounted tube 172 situated centrally in bottom wall 112$b$, which can be inclined downward toward the outlet to promote drainage. Outlet tube 172 connects with a drain line 174 through a fitting 176 which introduces the thermostatic bulb sensor 122 of a thermostatic switch control 126 into the interior of the drain line 174 where it is exposed to the efflux from chamber 112. The double-throw thermostatic switch 126 forms a series electrical circuit with solenoid 125, heat control 127 and terminals A,C which connect to a source of electrical power. In operation, the thermostat bulb 122, at the appropriate temperature, operates the double-throw thermostatic switch 126 which de-energizes solenoid 125 to close valve 124 and then energizes the heat control 127. Similarly, the converse of the foregoing chain of events takes place when thermostatic switch 126 is reversed in response to falling temperature detected by the bulb sensor 122. Circulation within chamber 112 is provided in cooker 110 by a blower wheel 128 rotatably mounted along one side 112s and powered by a motor (not shown). An electrical resistance heating element 130 mounted along a side wall 112s acts as a heat source, being controlled in typical fashion by heat control 127 in response to a thermostatic bulb sensor 134 disposed within a chamber 112 and switch 126 as well. In operation and use, the cooker 110 is similar to the cooker 10 described above.

Steam cookers of the type described above can be seen to have several advantages. First, they operate at low pressure and thus not only do away with expensive boiler-type construction, but also permit opening for inspection during use. Second, they are provided with a control which makes economical and safe use of steam. Third, by situating the steam control sensor in the drain, rather than on the oven bottom, reliable operation is obtained. Fourth, the cookers are readily adaptable to use with a heat source either independently or to provide superheated steam and thus are very versatile in use. Fifth, cooking conditions are rapidly attained because none of the cooker's heat is expended in reheating condensate, which instead drains from the cooking chamber.

While the heat source 30 has been described herein as an electric resistance heating element 130 mounted along a side wall it is within the scope of the invention to employ gas or oil fired apparatus as a heat source for the chamber 112.

The term "cooking" as used in the specification and claims is intended to and is to be understood as including heating precooked frozen foods, heating and finish cooking of partially cooked frozen foods and completely cooking uncooked frozen foods.

It should be understood that the present disclosure is for the purpose of illustration only and that this invention includes all modifications and equivalents falling within the scope of the appended claims.

I claim:

1. A steam cooking device comprising a chamber into which food is introduced for cooking, an inlet passage in said chamber, a source of steam connected to said inlet passage, a free-venting outlet passage from said chamber through which condensate is permitted to drain, a temperature-sensing means located in said outlet passage, and flow control means responsive to said temperature-sensing means to stop the flow of steam through said inlet passage when the temperature in said outlet passage corresponds to that of the steam at atmospheric pressure.

2. A cooking device according to claim 1, in which heating means is provided to superheat the steam and the temperature-sensing means is operable to turn on the heating means when the steam flow is stopped and turn it off when the steam flow is resumed.

3. A cooking device according to claim 2, wherein there is a timer switch in place of the temperature-sensing means.

4. A cooking device according to claim 1, wherein heating means is provided to superheat the steam together with a timer to turn on said heating means after a predetermined interval of cooking on saturated steam.

5. A cooking device according to claim 2, wherein said steam source is free-venting.

6. A steam cooking device according to claim 1, wherein said steam source comprises a direct connected free-venting boiler and a variable source of heat, and wherein said flow controlling means controls said heat source in response to said temperature-sensing means.

7. A steam cooking device according to claim 1, wherein said steam source is a direct connected free-venting flash-type steam generator and comprises a heated chamber and a variable source of water for instruction therein, and wherein said flow controlling means varies said water source in response to said temperature-sensing means.

8. A steam cooking device according to claim 1, wherein said sensing means is responsive to stop the flow of steam through the outlet at approximately 212°F.

9. A steam cooking device according to claim 1, further comprising means in said chamber for circulating steam introduced therein.

* * * * *